Feb. 20, 1945. J. G. L. DUVAL 2,369,886

DEVICE FOR THE PROTECTION AGAINST THE FORMATION OF ICE

Filed May 8, 1941

Inventor
Jean G. L. Duval

By Watson, Cole, Grindle & Watson
Attorneys

Patented Feb. 20, 1945

2,369,886

UNITED STATES PATENT OFFICE 2,369,886

DEVICE FOR THE PROTECTION AGAINST THE FORMATION OF ICE

Jean Georges Louis Duval, Saint-Cyr-sur-Mer, France, assignor to Olaer Patent Company, New York, N. Y., a society of New York Application May 8, 1941, Serial No. 392,587
In France February 2, 1940

1 Claim. (Cl. 244—134)

It is known that protection against the formation of ice on the surfaces of aircrafts constitutes an important problem. Attempts have been made to obtain this protection for the parts on which the formation of ice is dangerous, by heating said parts, or by means of mechanical devices such as deformable coverings into which compressed air is forced, the resulting deformations cracking the ice that has formed or is forming.

Most of these devices have failed to give the desired results or, at least, have been costly, complicated, and far from reliable.

The object of the present invention is to provide a device for protection against the formation of ice which is better adapted to meet the requirements of practice than those used for the same purpose up to the present time.

According to an essential feature of the present invention, I provide, on the parts of the airplane which are to be protected, a coating of a material which has the property of absorbing a fatty or waxy substance and of exuding this substance at its surface in small amounts but in a continuous manner and for a very long time, notwithstanding the effects of air pressures or low temperatures.

After many experiments, I have obtained satisfactory results by making use of rubber, either natural or synthetic, such as neoprene, butadiene, some polyvinylic polymerization products and, in particular, polyvinyl alcohols, for making the coating in question.

The material which is absorbed by this coating, and subsequently exudes therefrom, is a fatty or waxy substance, such as oil, paraffin, ozokerite, etc.

I may incorporate this substance into the coating material in many different ways, for instance:

a. By mixing this substance with the coating material during the manufacture thereof; or b. By introducing this substance into said material gradually as it becomes necessary, through any suitable means, such for instance as a pump; or c. Preferably by combining these two methods by applying, on the surfaces of the aircraft to be protected, a layer or coating of a material constituted by a mixture, in suitable proportions, of a natural or synthetic rubber and of a fatty or waxy substance, and providing, in the mass of this layer or coating cavities communicating through suitable conduits with a feeding device which replenishes, either continuously or periodically, the fatty or waxy substance.

Owing to the property of such a coating or layer of constantly exuding, from its surface, the fatty or waxy substance incorporated therein, the surface in question will not become coated with ice, as the latter cannot hold on the film of fatty or waxy substance in question.

I have also found that neither the counter-pressure nor the action of cold can prevent the exuding of the substance above referred to. Furthermore, it should be noted that some substances, such for instance, as rubber, under the effect of low temperatures, expand so that the exuding is intensified just when this exuding is particularly important.

My invention is therefore concerned, in a general manner, with any protective coating, especially intended for use on an aircraft element, constituted by a moulded or otherwise shaped mass of material such as natural or synthetic rubber, in which is incorporated a fatty or waxy substance adapted to be exuded from the coating surface and which does not solidify, at least in the crystalline form, at the lowest atmospheric temperatures.

Preferably, I avoid substances having an affinity for water.

According to a particularly advantageous embodiment, such coatings are made of a mixture of plastic matter and of a fatty or waxy substance, the mixture being formed while the coating is being manufactured.

Other features of the present invention will be apparent from the following detailed description of some specific embodiments thereof.

Preferred embodiments of the present invention will be hereinafter described, with reference to the accompanying drawing, given merely by way of example, and in which.

Figure 1:
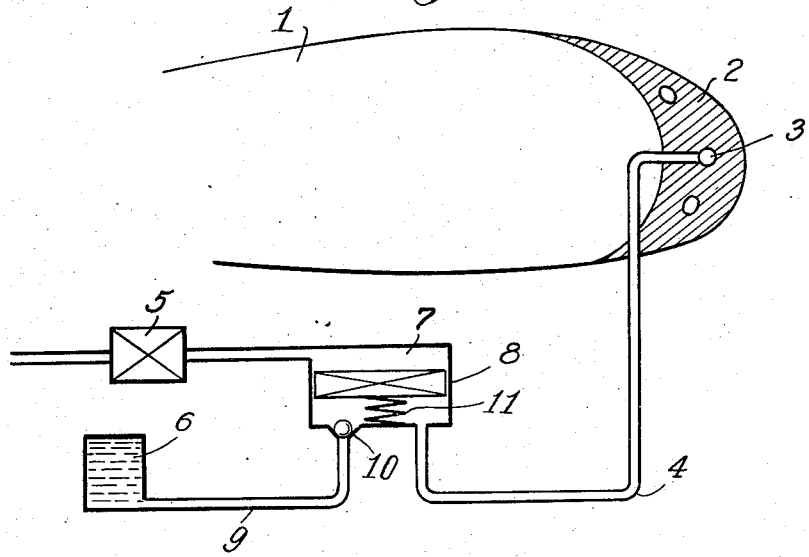
Fig. 1 is a sectional view showing the leading edge of a wing fitted with a protective coating and means for feeding oil to the inside of the coating in question.

In Fig. 1, reference character 1 designates an airplane wing, 2 the protective coating, 3 the cavities formed in this coating, and 4 a pipe carrying a liquid, such as oil, either mineral or otherwise, from a pump 5 to the inside of the coating, in such manner as to maintain in the latter the desired amount of this liquid, whereby the latter exudes continuously from the outer surface of the coating.

In the embodiment shown, it is desired to send into the cavities a certain amount of liquid under a very high pressure, but this might be dangerous, from the point of view of the mechanical resistance of this coating, if too large an amount of liquid were forced into the coating. In order to avoid any danger, according to my invention, I provide means for automatically limiting the amount of oil that can be sent into cavities 3.

This device includes a pump 5, which forces into a chamber 7 a fluid under pressure acting upon a piston 8 which in turn forces into conduit 4 the desired amount of liquid drawn from a reservoir 6 through a conduit 9 provided with a check valve 10. A spring 11 tends to bring piston 8 to its upper position.

As the volume under the piston 8 is limited, the amount of liquid sent into cavities 3 can never exceed a determined value. Of course, this arrangement is shown merely by way of example and cavities 3 can be fed with oil or any suitable other liquid in a different manner without departing from the principle of the invention.

Figure 2:
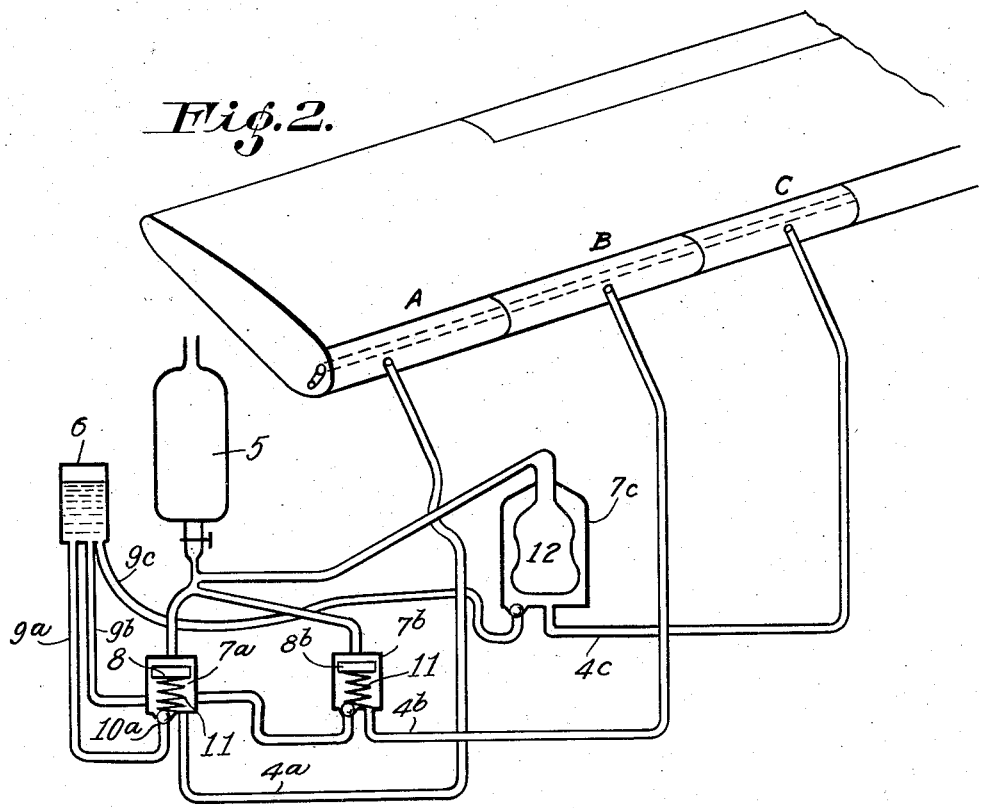
Fig. 2 is a diagrammatic perspective view of an airplane wing provided with a coating according to the invention, and means for feeding oil or another substance to the various sections of this coating.

In Fig. 2, I have shown a feed system in which different coating zones (A, B, C, etc.) are fed through separate devices each of which limits the volume of liquid sent to the corresponding zone of the coating. Owing to this arrangement, the deformation imparted to each of these zones is limited, while, if the whole span of the wing leading edge were fed from the same device, zones of lesser resistance (as may result from irregularities of manufacture or from other causes) would be excessively deformed.

In Fig. 2, the same reference characters designate the same parts as in Fig. 1. However, by way of example and in order to show possible modifications, one of the piston devices (of the type shown by Fig. 1) is replaced by a variable device of another type. This device 7c includes an inflatable bag 12 into which water under pressure is fed from pump 5. The oil occupies the space around said bag.

The operation of this device is the same as above described with reference to Fig. 1.

It is important to note that the device above described, or any equivalent device, for feeding a liquid or other fluid to the cavities of a coating in such manner as to limit the volume of fluid fed to said coating, either as a whole or separately to different sections thereof, constitutes an important feature of my invention, which can be applied irrespective of the type of coating or of the nature of the fluid.

When the coating is made of a material in which has been incorporated, in the course of its manufacture, an exuding fatty or waxy substance, the problem of fixing such a coating to the surface to be protected may involve serious difficulties.

According to a feature of my invention, the protective coating to be fixed on the aircraft element is made of two portions, one of which, to wit the external portion, is of an exuding nature, while, in the other portion, these exuding properties have been eliminated (by adding suitable substances thereto) so that this last mentioned portion can easily be fixed to the airplane structure. The two portions are assembled by being vulcanized together.

According to another feature of my invention, I fix the coating to the airplane element by means of metallic supports extending therethrough in such manner as to avoid the necessity of securing an exuding portion to another portion.

While I have, in the above description, disclosed what I deem to be practical and efficient embodiments of the present invention, it should be understood that I do not wish to be limited thereto, as many changes can be made in the arrangement, disposition and form of the parts without departing from the principle of the present invention as comprehended within the scope of the appended claim.

What I claim is:

A device for protecting a surface against accumulation of ice thereon which comprises a coating for said surface made of a rubber like substance, said coating having a plurality of cavities independent from each other therein, means to feed intermittently a predetermined amount of liquid under high pressure to each said cavity, said liquid having lubricating properties and being capable of exuding in a continuous manner from the surface of said coating, and said amount being sufficient to cause a limited deformation of the zone of said coating surrounding each said cavity.

JEAN GEORGES LOUIS DUVAL.